Oct. 6, 1959  E. W. SPANNHAKE  2,907,399
VEHICLE STEERING MECHANISM
Filed Sept. 26, 1955  3 Sheets-Sheet 1

INVENTOR:
ERNST W. SPANNHAKE
BY John F. Schmidt
ATTORNEY

Oct. 6, 1959 E. W. SPANNHAKE 2,907,399
VEHICLE STEERING MECHANISM
Filed Sept. 26, 1955 3 Sheets-Sheet 2

INVENTOR:
ERNST W. SPANNHAKE
BY John F. Schmidt
ATTORNEY

Oct. 6, 1959 E. W. SPANNHAKE 2,907,399
VEHICLE STEERING MECHANISM
Filed Sept. 26, 1955 3 Sheets-Sheet 3

*INVENTOR:*
ERNST W. SPANNHAKE
BY
John F. Schmidt
ATTORNEY

# United States Patent Office 2,907,399
Patented Oct. 6, 1959

2,907,399
VEHICLE STEERING MECHANISM

Ernst W. Spannhake, Peoria, Ill., assignor to LeTourneau-Westinghouse Company, Peoria, Ill., a corporation of Illinois Application September 26, 1955, Serial No. 536,620

10 Claims. (Cl. 180—79.1)

This invention relates to vehicle steering mechanism, and especially to power steering with a feedback feature.

There is a great deal of very heavy mobile equipment which must be steered with the help of power greater than that available by a human operator's use of his own muscles. It is quite a simple matter to provide power steering which operates by the simple actuation of an electric switch or a hydraulic valve; however, steering of this type has a disadvantage in that it is fundamentally different from the steering of a motor vehicle, and this difference is a disadvantage because probably the vast majority of equipment operators drive their own motor vehicles and are therefore conditioned or accustomed to that type of operation. Thus, whereas the steerable or dirigible wheels of a conventional motor vehicle stop their steering motion when motion of the steering wheel stops, heavy duty mobile equipment with simple power steering operates in such a manner that the dirigible wheels continue to turn (in a steering sense) so long as the steering wheel is held in an operating position other than neutral.

It is accordingly an object of this invention to provide a steering mechanism for heavy duty equipment which requires a minimum of muscular effort on the part of the operator but which incorporates a feedback feature so that the operator must continue to turn the steering wheel if he wishes the dirigible wheels to keep turning in the steering sense. This and other objects are accomplished in a steering mechanism having means responsive to steering movement of the dirigible wheels which shuts off the flow of power to the prime mover that provides the actual steering effort.

Figure 1:
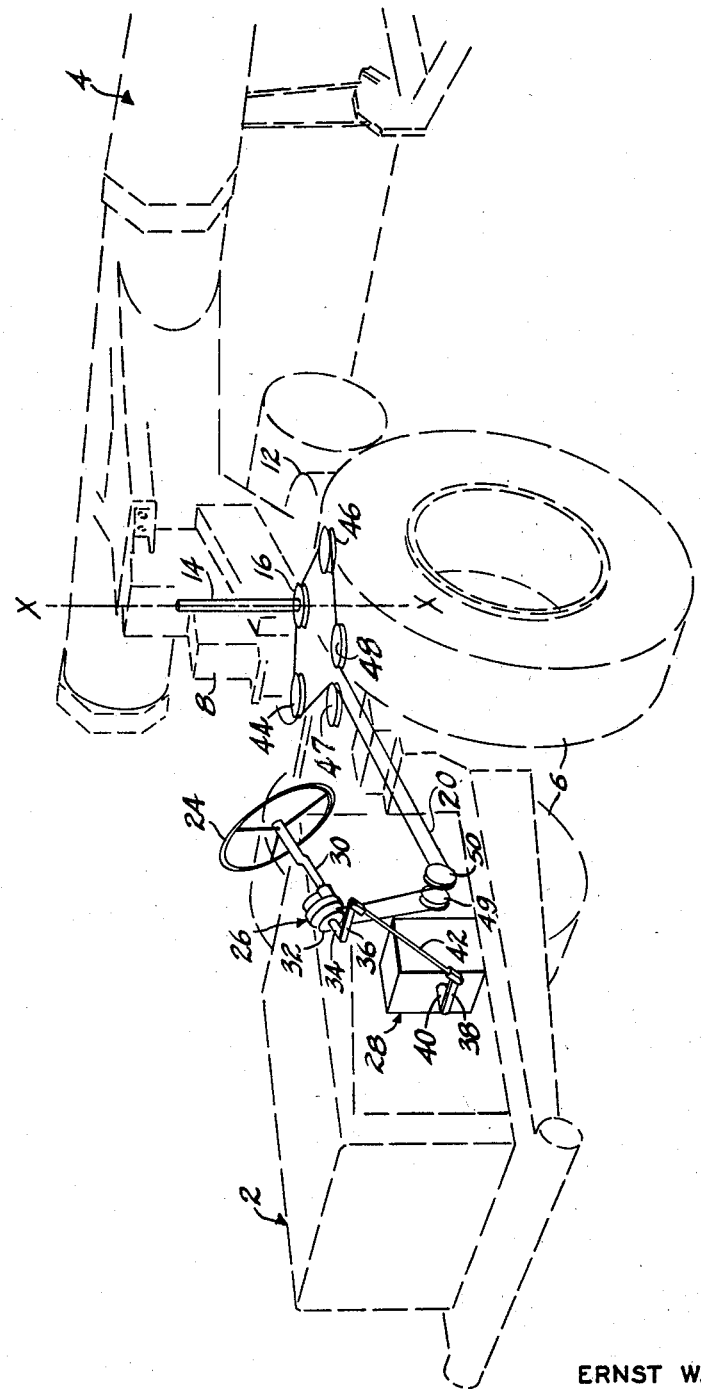
Fig. 1 is a perspective view of steering mechanism made according to this invention, with a type of vehicle to which the steering is applicable indicated in phantom.

Referring now in detail to the drawings, Fig. 1 shows in phantom a substantial portion of a heavy duty earthmoving vehicle of the general type shown in Patents 2,535,301 to R. G. LeTourneau, and Re. 23,251 to G. I. Clark. More pertinent to the steering mechanism is Patent 2,400,868 to R. G. LeTourneau. Vehicles of this general type are in the heavy duty earthmoving class and operate almost entirely off the highway.

The vehicle shown in phantom in Fig. 1 could be a scraper as in the above patent to Clark and the LeTourneau Patent 2,535,301, it could be another type of hauling unit such as shown in the other above LeTourneau patent, or any comparable or similar heavy duty, mobile piece of equipment. In the embodiment shown, the vehicle comprises a two-wheel tractor indicated generally at 2 and a trailing unit indicated generally at 4. For reference purposes, it will be understood that the vehicle has a fixed axis which may for convenience be taken as the long axis of the trailing unit, being parallel to the direction of motion when the vehicle is moving in a straight line. The long axis of the trailing unit is taken as the reference axis simply because, with this type of vehicle, the entire tractor 2 pivots about steering axis X—X when the vehicle is steered. For this reason, it is not feasible to use an axis of the tractor as the reference axis. Taking the long axis of the trailing unit as the fixed or reference axis, it will of course be understood that the tractor wheels 6 change their orientation relative to the reference axis whenever the vehicle is steered.

In the embodiment shown, the tractor wheels 6, 6 constitute dirigibly mounted ground engaging means, although it will of course be apparent to those skilled in the art that means other than wheels could be used. Means are provided to change the orientation of the ground engaging means relative to the fixed axis of the vehicle referred to, and these means include a motor. In the embodiment shown an electric motor is used, and this motor may conveniently be enclosed in a protective housing 8. The motor is not shown as such in Fig. 1, but is shown schematically at 10 in Fig. 5. As will best be understood by reference to the above Patent 2,400,868, motor 10 drives a pinion through a suitable gear reduction, and the pinion meshes with a ring gear which is indicated in phantom at 12. As will be understood by reference to the patent identified immediately above, the motor and pinion may conveniently be secured to the trailing unit, and the ring gear may be secured to the tractor and mounted to pivot on suitable bearings about the axis X—X. The ring gear may be internal or external, as will be understood by those skilled in the art. The details of the gear train for the steering motor drive do not form any part of this invention and they are accordingly not shown or discussed here.

Also secured to the trailing unit and coincident with axis X—X is a fixed shaft 14 which carries at its lower end a sheave 16. Sheave 16 is provided with a tangential slot 18 to receive a cable 20, cable 20 being secured against movement in slot 18 by one or more setscrews, such as the one shown at 22.

Operator-operable control means are provided and include in the embodiment shown a steering wheel 24. The control means 24 are connected to actuating means indicated generally at 26; actuating means 26 in turn have a connection with the electric motor control means indicated generally at 28. In the embodiment shown, actuating means 26 includes an input shaft 30 to which the control means comprising steering wheel 24 is connected, a feedback input member 32, and an output shaft 34. Arm 36 is mounted on and rotates with output shaft 34. An arm 38 is mounted on and rotates with a shaft 40 of motor control 28, and a link 42 connects arms 36 and 38.

Cable 20 passes through slot 18, and each end makes one full wrap around sheave 16, the two ends wrapping in opposite directions of course. The cable then extends forward and partially wraps around sheaves 44 and 46, these two sheaves being mounted on axes which are secured to and move with the tractor unit. The two portions of cable 20 extend inward and partially wrap around sheaves 47 and 48, and then extend forward to other sheaves 49 and 50. The cable ends thence extend upward to feedback input 32 which comprises a cable sheave. The ends of the cable wrap around sheave 32 and are secured to the sheave. The cable ends reach sheave 32 at tangents which are substantially at opposite ends of a diameter, and each end preferably wraps around the sheave more than 180°, preferably receiving a wrap of one and one-half turns or more. Thus, cable 20 and its associated sheaves 16, 44, 46, 47, 48, 49, and 50 comprise means responsive to changes in orientation of the ground engaging means, and of course the responsive means thus indicated is connected to the actuating means because of the connection of the ends of cable 20 on the feedback sheave 32.

Figure 2:
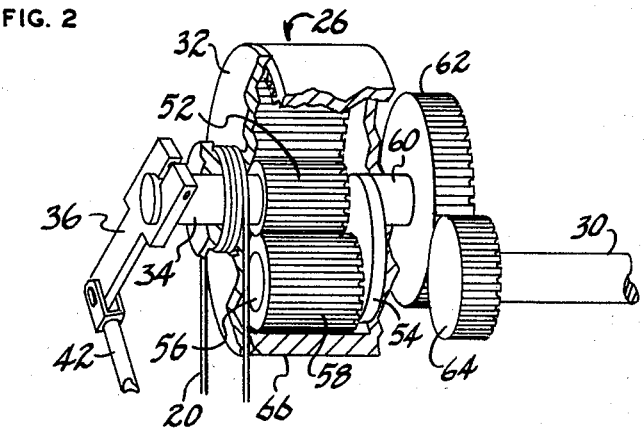
Fig. 2 is a view in perspective, with parts broken away and in section, of the actuating mechanism.

Reference is now made to Fig. 2 for a description in detail of actuating means 26. As there seen, actuating means 26 comprises planetary gearing, or more specifically, a planetary gear train having a sun element, a planet carrier element, and a ring element; as will be seen, two of these elements are connected to the two control means 24 and 28 and the third element is connected to the responsive means (cable 20, etc.).

More specifically, the planetary gear train has a sun element or sun gear 52 which is mounted on and rotates with shaft 34. The planet carrier element or assembly includes a planet carrier 54, a planet gear shaft 56 integral with planet carrier 54, and a planet gear 58 rotatably mounted on shaft 56 and in mesh with sun gear 52. Planet carrier 54 is mounted for revolution about the axis of a shaft 60 on which is mounted a drive gear 62. Drive gear 62 rotates with shaft 60, and meshes with a drive pinion 64 mounted on and for rotation with input shaft 30. The output shaft is, of course, shaft 34.

The axis of ring gear 66 envelops the sun and planet gears. Ring gear 66 is of course coincident with the axes of shaft 34 and sun gear 52, and ring gear 66 meshes with planet gear 58. Ring gear 66 is secured in any suitable manner to the input sheave 32 and for all practical purposes, forms an integral part therewith. It will of course be understood by those skilled in the art that shaft 34 is rotatable relative to input sheave 32.

Figure 3:
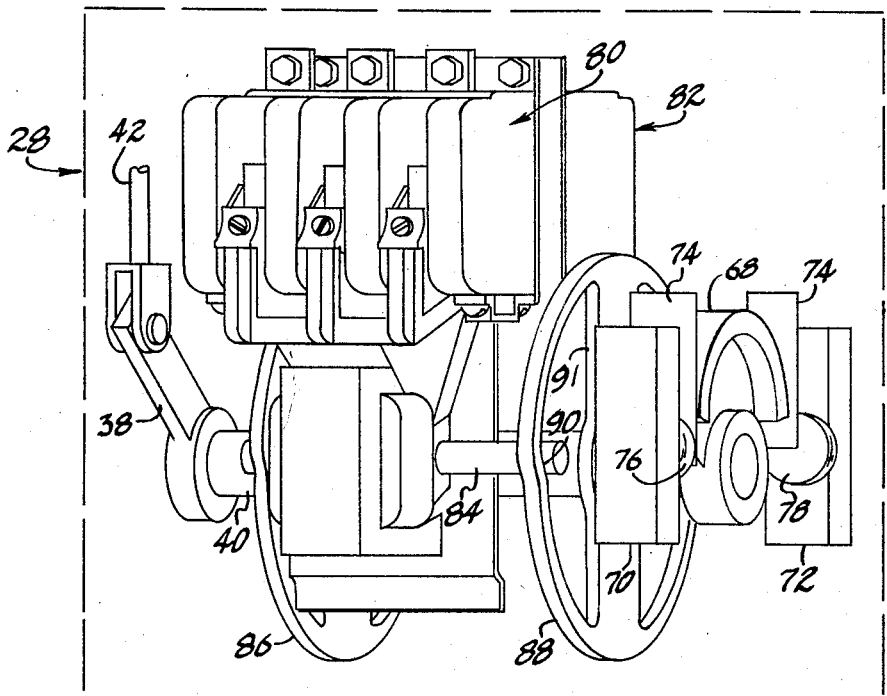
Fig. 3 is a view in perspective of the motor control mechanism.

The motor control 28 will now be described in detail, for which purpose reference is had to Fig. 3. Shaft 40 is shown in Fig. 1, and as can be seen in Fig. 3, carries at its end opposite arm 38 a direction selector element comprising a cam 68; cam 68 is of course secured to and rotates with shaft 40. A pair of relay switches 70 and 72 are mounted adjacent cam 68 on opposite sides thereof. In a preferred form of the invention, cam followers 74 may be provided intermediate cam 68 and the actuating buttons 76 and 78 of switches 70 and 72 respectively. Between the relay switches and arm 38, there are disposed on opposite sides of shaft 40 a pair of contactors indicated generally at 80 and 82. These contactors may be any of a number of commercially available satisfactory types; a contactor which has been found suitable to the intended purpose of this invention is one disclosed and claimed in Patent 2,424,308 to Ellis et al. Inasmuch as the contactor itself forms no part of the invention, its details will not be set forth here. It will of course be appreciated by those skilled in the art that each of contactors 80 and 82 is biased toward a normally open position. In the contactor of the Ellis et al. patent identified above, this bias is accomplished by a spring. If there should be sticking of the contacts of one contactor to prevent opening of that contactor in the normal manner before the other contactor is closed, severe damage could result to the mechanism. To prevent such damage, means are provided, operable by the actuating means, to effect positive opening of the deenergized contactor before energization of the other takes place. Thus, a pin 84 extends through and is secured in the pivotally mounted arm or bracket which carries the moving contacts. Pin 84 is shown as being associated with contactor 80; it will of course be understood that there is a similar pin on the other side of shaft 40 associated with contactor 82. Cams 86 and 88 are mounted on shaft 40 to rotate therewith, at opposite sides of contactors 80 and 82. Cams 86 and 88 are provided with cam surfaces 90 and 91. Pin 84 and the movable contacts are on opposite sides of the pivot axis of the arm or bracket on which they are mounted. Accordingly, when shaft 40 is turned in the direction to close contactor 80, if for some reason it is not closed by actuation of its relay, then cam surfaces 91 of cams 86 and 88 engage pin 84 and close the contacts. Conversely, if deenergization of its coil does not suffice to open contactor 80, cam surfaces 90 of cams 86 and 88 engage pin 84 and force the contacts open before contactor 82 closes.

Figure 5:
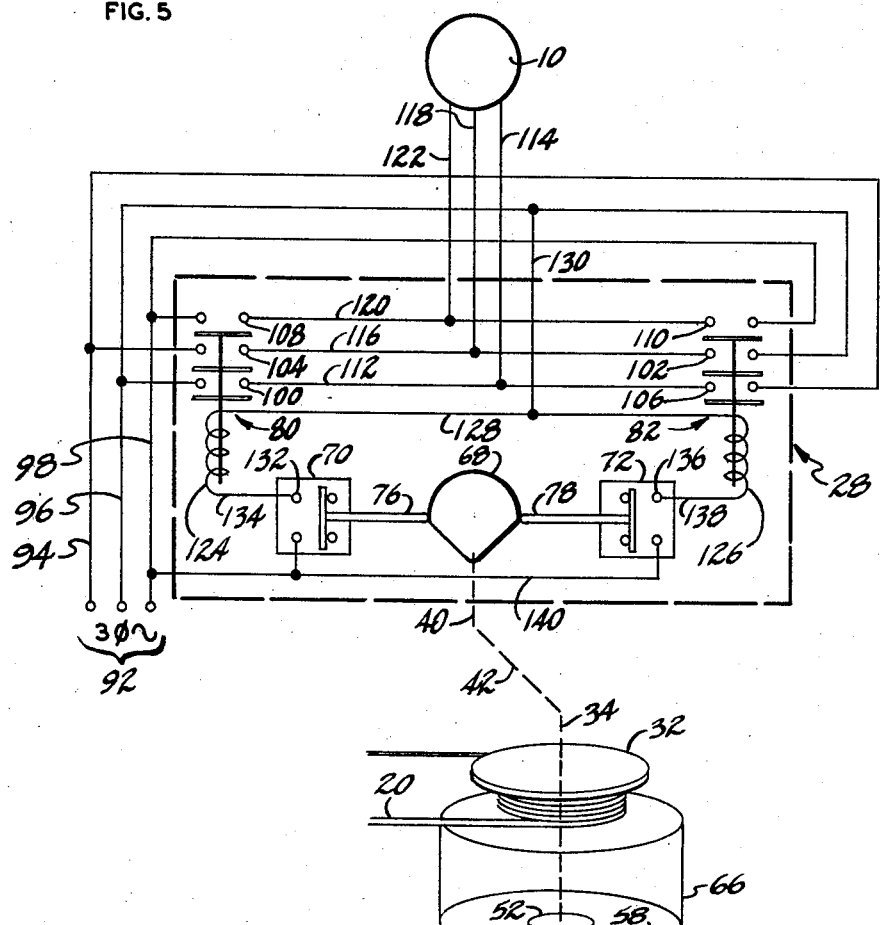
Fig. 5 is a circuit diagram of the electric motor and its control mechanism, coupled with a schematic showing of the steering wheel and the actuating mechanism incorporating the feedback feature.
Figure 4:
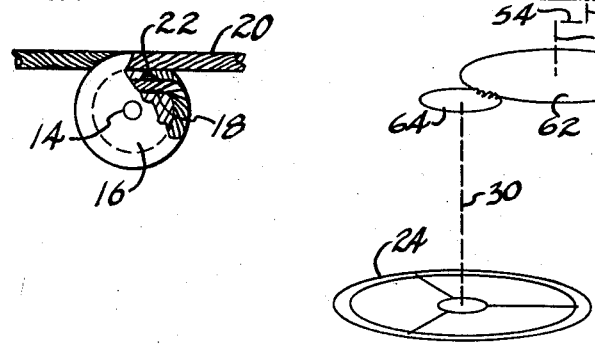
Fig. 4 is a top plan view of one detail of the feedback mechanism.

Reference will now be had to Fig. 5 for a description of the electric circuit and its relationship to the mechanism described above. A source of three-phase alternating current supply is shown at 92 and consists of three power leads 94, 96, and 98. In order to provide for reversal of motor 10, lead or line 96 is connected to the bottom set of stationary contacts 100 of contactor 80 and to the middle set 102 of stationary contacts of contactor 82, while line or lead 94 is connected to the middle set of stationary contacts 104 of contactor 80 and to the bottom set 106 of stationary contacts of contactor 82. The remaining line 98 is connected to the upper sets of stationary contacts 108, 110 of contactors 80 and 82 respectively.

It will of course be understood that the stationary contacts are arranged in pairs, and one contact of each pair is connected with the associated "hot" line 94, 96, or 98, as indicated. The other contact of each pair is of course "cold." The cold contacts 100 and 106 are connected by a line 112 which in turn is connected with motor 10 by a line 114. The cold contacts 104 and 102 are connected by a line 116, which in turn is connected with motor 10 by a line 118. Cold contacts 108 and 110 are connected by a line 120, which in turn is connected with motor 10 by a line 122.

Contactor 80 is provided with a coil 124 and contactor 82 is provided with a similar coil 126. Coils 124 and 126 are interconnected at their upper ends as seen in Fig. 5 by a line 128, which in turn is connected by a line 130 with line 96. The lower end of coil 124 is connected with the cold one of a set of contacts 132 of relay switch 70 by a line 134. The lower end of coil 126 is connected with the cold one of a set of contacts 136 by means of a line 138. The hot ones of contacts 132 and 136 are connected with line 98 by a branch line 140.

Operation

Referring now to Fig. 5, let it be assumed that the operator desires to steer the vehicle to the right. He turns wheel 24 through a given arc, turning pinion 64 at the same time. Pinion 64 meshes with and turns drive gear 62. Drive gear 62 and planet carrier 54 are both mounted on shaft 60; planet carrier 54 therefore rotates with shaft 60. As planet carrier 54 rotates about the axis of shaft 60, the planet carrier takes with it the axis of shaft 56 and thus also of course, planet gear 58.

Planet gear 58 meshes with ring gear 66. For this stage of the operation, ring gear 66 is the reaction member because it is functionally integral with sheave 32 which is being held stationary by cable 20. With ring gear 66 held stationary, planet gear 58 rotates about its own axis, driving sun gear 52 and rotating it about its axis. Rotation of sun gear 52 effects turning of output shaft 34, on which arm 36 (Fig. 2) is mounted. Movement of arm 36 is transmitted to arm 38 (Fig. 3) through link 42.

Arm 38 turns shaft 40, on which is mounted the direction selector element or cam 68. The direction of rotation of shaft 40 will depend on the orientation of arms 36 and 38 on their respective shafts. Let it be assumed for the sake of this discussion that shaft 40 rotates cam 68 counterclockwise as seen in Fig. 5. Cam 68 thus engages button 76 of relay 70, and bridges the stationary contacts 132.

The closing of relay 70 thus completes a circuit as follows: line 98 of source 92, a portion of line 140, contacts 132 of switch 70, line 134, coil 124 of contactor 80, line 128, line 130, and line 96 of source 92.

Thus contactor 80 is energized and its contacts are closed, completing a power circuit for rotation of motor 10 in one direction. Motor 10 drives its pinion as can best be understood by reference to Patent 2,400,868 LeTourneau, and the pinion drives the ring gear. Inasmuch as the motor 10 is mounted on one unit, and the ring gear on the other, steering motion of the tractor begins relative to the trailing unit. In the embodiment of the invention contemplated here, as in the embodiment shown in the patent referred to immediately above, the steering motor 10 is fixed relative to the trailing unit and the ring gear is fixed relative to the tractor or towing unit. Thus, rotation of ring gear 12 effects pivoting of the tractor about the axis X—X (Fig. 1).

As the tractor swings toward the right about axis X—X, input sheave 32 turns clockwise as seen from the front of the vehicle (Fig. 1), driving ring gear 66 clockwise.

At this stage of the operation, planet carrier 54 is the reaction element, because it is presumed that the steering wheel is being held stationary for the moment. With the axis of shaft 56 stationary, planet gear 58 rotates clockwise about the axis of shaft 56, and sun gear 52 is driven counterclockwise about its axis of rotation. This rotation of sun gear 52 is in the opposite direction of the rotation induced at the beginning of the operation, whereupon shaft 34 operates through arms 36, 38 and link 42 to reverse the rotation of cam 68, deenergizing contactor 80, and stopping the steering motor 10.

It will be seen from the foregoing that a power circuit for steering motor 10 can be kept closed only so long as the operator continues to turn the steering wheel. Operation in the reverse direction will of course be understood by those skilled in the art from the foregoing, and need not be detailed here.

It will be seen that rotation in one direction of shaft 40, namely in a direction to close contactor 80, will not effect engagement of cam surfaces 90 and pin 84. However, rotation of cam 40 in the opposite direction, to close contactor 82, will effect engagement of cam surfaces 90 with pin 84 in such a way as to force contactor 80 into the open position, if it has not already opened, before contactor 82 is closed. As was pointed out above, cam surfaces 91 will engage pin 84 and close the contacts if for some reason contactor 80 is not closed by its relay. Operation of the mechanism for contactor 82 will be readily understood from the foregoing.

It may be pointed out here that the tractor and trailer units are preferably connected so as to permit relative oscillation about a longitudinal axis to accommodate unevenness in the terrain. Such twisting or oscillation of tractor 2 relative to trailer 4 has a negligible effect on the steering mechanism because sheaves 47 and 48 are mounted as close as possible to the axis of oscillation.

It will be seen from the above description that this invention provides a simple and effective power steering mechanism for heavy duty equipment which simulates the steering of ordinary motor vehicles. Other advantages will be apparent to those skilled in the art.

What is claimed is:

1. Steering mechanism for a vehicle having dirigibly mounted ground engaging means, comprising: means including an electric motor having a connection to change the orientation of the ground engaging means relative to a fixed axis of the vehicle; motor control means including a contactor biased toward normally open position, relay means to close the contactor electrically, and positive mechanical means to open and close the contactor in case of failure of the electrical means; actuating means connected to the control means; operator-operable control means connected to the actuating means; and means responsive to changes in orientation of the ground engaging means and having a connection to the actuating means which is independent of the first-named connection.

2. Steering mechanism for a vehicle having dirigibly mounted ground engaging wheels, comprising: means, including an electric motor, having a connection to change the orientation of the ground engaging means; motor control means including a pair of switches and a direction selector element operable to close a selected switch; actuating means connected to the direction selector element and including a feedback input; operator-operable control means connected to the actuating means; and means responsive to changes in orientation of the ground engaging means and having a connection to the feedback input which is independent of the first-named connection.

3. Steering mechanism for a vehicle having dirigibly mounted ground engaging means and comprising: means including a motor to change the orientation of the ground engaging means relative to a fixed axis of the vehicle; control means for the motor including electrical means to close a switch against a normally open bias and mechanical means to open and close the switch, the mechanical means being operable to close the switch after operation of the electrical means is effected and to open the switch after the electrical means for opening has been operated; actuating means connected to the control means; and operator-operable control means connected to the actuating means.

4. Mechanism as in claim 3, in which the mechanical means includes a pin on a pivotally mounted arm and a cam having a pair of cam surfaces positioned to engage the pin.

5. Steering mechanism for a vehicle consisting of a two-wheel tractor unit and a trailing unit, the two units being mounted for relative pivoting about a normally vertically axis, the mechanism comprising: means, including a motor, to effect pivoting of one unit relative to the other; means to control the motor; actuating means connected to the motor control means and having a feedback input; operator-operable control means connected to the actuating means; and means responsive to relative pivoting of the two units including a cable secured to one of the units and connected to the feedback input.

6. Mechanism as in claim 5, in which the actuating means comprises a planetary gear train having a sun member, a ring member, and a planet carrier member, two of the members being connected with the control means and the third said member being connected to the feedback input.

7. Steering mechanism for a vehicle having dirigibly mounted ground engaging means and comprising: means including a motor to change the orientation of the ground engaging means relative to a fixed axis of the vehicle; control means for the motor including electrical means to close a switch against a normally open bias and mechanical means to open and close the switch, the mechanical means including a member to effect positive movement and a member to be moved, the member to be moved being connected for movement by the electrical means such that operation of the electrical means moves the member to a position where it is no longer engageable by the member to effect positive movement; actuating means connected to the control means; and operator-operable control means connected to the actuating means.

8. Steering mechanism as in claim 7, in which the member to effect positive movement and the member to be moved comprise a cam and cam follower.

9. Steering mechanism for a vehicle consisting of a two-wheel tractor unit and a trailing unit, the two units being mounted for relative pivoting about a normally vertical axis, the mechanism comprising: means, including a motor, to effect pivoting of one unit relative to the other; means to control the motor; three-element actuating means having a feedback input connected with one of the elements; means connecting another of the elements with the motor control means; operator-operable means connected with the remaining one of the three elements; and a cable secured to one of the two units and connected to drive the feedback input, whereby pivoting of one unit relative to the other effects movement of the feedback input and its connected element of the actuating means.

10. Steering mechanism for a vehicle consisting of a two-wheel tractor unit and a trailing unit, the two units being mounted for relative pivoting about a normally vertically axis, the mechanism comprising: means, including a motor, having a connection to effect pivoting of one unit relative to the other; means to control the motor; actuating means having a feedback input and comprising a planetary gear train having a sun member, a ring member, and a planet carrier member, two of the members being connected with the motor control means and the third member being connected to the feedback input; operator-operable control means having a connection to the actuating means, and means responsive to relative pivoting of the two units and connected to the feedback input.

References Cited in the file of this patent

UNITED STATES PATENTS

| | | |
|---|---|---|
| 1,377,306 | Brush | May 10, 1921 |
| 1,948,487 | Berry | Feb. 27, 1934 |
| 2,109,418 | Fuller | Feb. 22, 1938 |
| 2,312,942 | Ulinski | Mar. 2, 1943 |
| 2,453,949 | Ulinski | Nov. 16, 1948 |
| 2,531,061 | LeTourneau | Nov. 21, 1950 |
| 2,553,795 | Staude | May 22, 1951 |
| 2,614,644 | Gustafson | Oct. 21, 1952 |
| 2,742,100 | Rockwell | Apr. 17, 1956 |

FOREIGN PATENTS

| | | |
|---|---|---|
| 993,964 | France | Nov. 9, 1951 |

UNITED STATES PATENT OFFICE
CERTIFICATE OF CORRECTION

Patent No. 2,907,399                                                             October 6, 1959

Ernst W. Spannhake

It is hereby certified that error appears in the printed specification of the above numbered patent requiring correction and that the said Letters Patent should read as corrected below.

Column 3, lines 32 and 33, should read as shown below instead of as in the patent:

A ring gear 66 envelops the sun and planet gears. The axis of ring gear 66 is of course coincident with the Signed and sealed this 29th day of March 1960.

(SEAL)
Attest:

KARL H. AXLINE
Attesting Officer
                                                                            ROBERT C. WATSON
                                                                            Commissioner of Patents